United States Patent
McLennaghan

(10) Patent No.: US 9,688,803 B2
(45) Date of Patent: Jun. 27, 2017

(54) PRESSURE SENSITIVE ADHESIVE COMPOSITION WITH SILANE GRAFTED OLEFIN BLOCK COPOLYMER

(71) Applicant: Dow Global Technologies LLC, Midland, MI (US)

(72) Inventor: Allan W. McLennaghan, Lachen (CH)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 3 days.

(21) Appl. No.: 14/651,999

(22) PCT Filed: Dec. 9, 2013

(86) PCT No.: PCT/US2013/073812
§ 371 (c)(1),
(2) Date: Jun. 12, 2015

(87) PCT Pub. No.: WO2014/105402
PCT Pub. Date: Jul. 3, 2014

(65) Prior Publication Data
US 2015/0315429 A1 Nov. 5, 2015

Related U.S. Application Data

(60) Provisional application No. 61/747,526, filed on Dec. 31, 2012.

(51) Int. Cl.
| | | |
|---|---|---|
| C08F 297/08 | (2006.01) | |
| C09J 7/02 | (2006.01) | |
| C09J 153/00 | (2006.01) | |
| C09J 11/06 | (2006.01) | |
| C08K 5/138 | (2006.01) | |
| C08K 5/01 | (2006.01) | |

(52) U.S. Cl.
CPC ............ C08F 297/083 (2013.01); C08K 5/01 (2013.01); C08K 5/138 (2013.01); C09J 7/0221 (2013.01); C09J 11/06 (2013.01); C09J 153/00 (2013.01); C08L 2666/24 (2013.01)

(58) Field of Classification Search
CPC .... C08F 297/083; C09J 7/0221; C09J 153/00; C09J 11/06; C08K 5/138; C08K 5/01; C08L 2666/24
USPC ........................................................ 524/505
See application file for complete search history.

(56) References Cited

U.S. PATENT DOCUMENTS

| | | |
|---|---|---|
| 5,266,627 A | 11/1993 | Meverden et al. |
| 5,911,940 A | 6/1999 | Walton et al. |
| 6,124,370 A | 9/2000 | Walton et al. |
| 7,608,668 B2 | 10/2009 | Shan et al. |
| 7,858,706 B2 | 12/2010 | Arriola et al. |
| 7,893,166 B2 | 2/2011 | Shan et al. |
| 7,897,689 B2 | 3/2011 | Harris et al. |
| 7,947,793 B2 | 5/2011 | Marchand et al. |
| 2008/0070053 A1 | 3/2008 | Schmierer et al. |
| 2008/0167421 A1 | 7/2008 | Yalvac et al. |
| 2010/0076128 A1 | 3/2010 | Abhari et al. |
| 2011/0003916 A1* | 1/2011 | Becker .................. C08F 255/02 524/68 |
| 2011/0021103 A1* | 1/2011 | Alper ....................... B32B 5/26 442/329 |

FOREIGN PATENT DOCUMENTS

GB 1426497 2/1976

OTHER PUBLICATIONS

Dobrynin, J. Chem. Phys., 107(21), pp. 9234-9238 (1997).
Potemkin, Physical Review E, 57(6), pp. 6902-6912 (1998).
Williams, et al., Polymer Letters, vol. 6, p. 621-624 (1968).

* cited by examiner

*Primary Examiner* — Angela C Scott
(74) *Attorney, Agent, or Firm* — Husch Blackwell LLP

(57) ABSTRACT

The present disclosure is directed to a pressure sensitive adhesive composition. The pressure sensitive adhesive composition includes an olefin block copolymer, a silane-grafted olefin block copolymer, a tackifier, and an oil. The pressure sensitive adhesive composition has a shear adhesion greater than 60 minutes. The pressure sensitive adhesive composition exhibits improved shear adhesion while simultaneously maintaining loop tack greater than 4.0 N/25 mm.

12 Claims, No Drawings

PRESSURE SENSITIVE ADHESIVE COMPOSITION WITH SILANE GRAFTED OLEFIN BLOCK COPOLYMER

FIELD

The present disclosure is directed to pressure sensitive adhesive compositions.

BACKGROUND

An adhesive is a substance capable of holding solid materials (e.g., adherents or substrates) together by surface attachment. Pressure sensitive adhesives (PSAs) generally are adhesive materials which bond to adherents when a required pressure is applied to effect an adhesion to the adherents. PSAs can be permanent or removable. Removable PSAs have been widely used in re-positionable applications, such as POST-IT notes. PSAs are also employed to facilitate the bonding of flooring tiles and carpets to the ground, packaging, posters, labeling upon various substrates, road signs, and the like.

Pressure sensitive adhesives are generally based on a polymer, a tackifier and an oil. Some common PSAs are based on polymers such as natural rubbers, synthetic rubbers (e.g., styrene-butadiene rubber (SBR) and SIS), polyacrylates, polymethacrylates, and poly-alpha-olefins. The PSAs can be solvent-based, water-based, or hot melt systems.

Despite the research efforts in developing pressure sensitive adhesive compositions, there is still a need for a pressure sensitive adhesive composition with improved balance of properties such as shear adhesion, loop tack, and peel strength.

SUMMARY

The present disclosure is directed to a pressure sensitive adhesive composition. In an embodiment, the pressure sensitive adhesive composition includes an olefin block copolymer, a silane-grafted olefin block copolymer, a tackifier, and an oil. The pressure sensitive adhesive composition has a shear adhesion greater than 60 minutes.

In an embodiment, the pressure sensitive adhesive composition also has a loop tack greater than 4.0 N/25 mm.

An advantage of the present disclosure is a pressure sensitive adhesive composition with improved shear adhesion (shear adhesion greater than 60 minutes) that simultaneously maintains loop tack greater than 4.0 N/25 mm.

DETAILED DESCRIPTION

The present disclosure provides a pressure sensitive adhesive (PSA) composition. In an embodiment, the PSA composition includes an olefin block copolymer, a silane-grafted olefin block copolymer, a tackifier, and an oil. The PSA composition has a shear adhesion greater than 60.0 minutes.

1. Olefin Block Copolymer

The present PSA composition includes an olefin block copolymer. The term "olefin block copolymer" or "OBC" means an ethylene/α-olefin multi-block copolymer and includes ethylene and one or more copolymerizable α-olefin comonomer in polymerized form, characterized by multiple blocks or segments of two or more polymerized monomer units differing in chemical or physical properties. The terms "interpolymer" and "copolymer" are used interchangeably herein. When referring to amounts of "ethylene" or "comonomer" in the copolymer, it is understood that this means polymerized units thereof. In some embodiments, the multi-block copolymer can be represented by the following formula:

Where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows:

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole block copolymer, i.e., ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer that is preferably an α-olefin having 3 or more carbon atoms. In some embodiments, the olefin block copolymer may comprise 50 mol % to 90 mol % ethylene, preferably 60 mol % to 85 mol %, more preferably 65 mol % to 80 mol %. For many ethylene/octene block copolymers, the preferred composition comprises an ethylene content greater than 80 mole percent of the whole polymer and an octene content of from 10 to 15, preferably from 15 to 20 mole percent of the whole polymer.

The olefin block copolymer includes various amounts of "hard" and "soft" segments. "Hard" segments are blocks of polymerized units in which ethylene is present in an amount greater than 95 weight percent, or greater than 98 weight percent based on the weight of the polymer, up to 100 weight percent. In other words, the comonomer content (content of monomers other than ethylene) in the hard segments is less than 5 weight percent, or less than 2 weight percent based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 weight percent, or greater than 8 weight percent, greater than 10 weight percent, or greater than 15 weight percent based on the weight of the polymer. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent and can be up to 100 weight percent.

The soft segments can be present in an OBC from 1 weight percent to 99 weight percent of the total weight of the OBC, or from 5 weight percent to 95 weight percent, from 10 weight percent to 90 weight percent, from 15 weight percent to 85 weight percent, from 20 weight percent to 80 weight percent, from 25 weight percent to 75 weight percent, from 30 weight percent to 70 weight percent, from 35 weight percent to 65 weight percent, from 40 weight percent to 60 weight percent, or from 45 weight percent to 55 weight percent of the total weight of the OBC. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Inter-polymers," filed on Mar. 15, 2006, in the name of Colin L. P. Shan, Lonnie Hazlitt, et. al. and assigned to Dow Global Technologies Inc., the disclosure of which is incorporated by reference herein in its entirety. In particular, hard and soft segment weight percentages and comonomer content may be determined as described in Column 57 to Column 63 of U.S. Pat. No. 7,608,668.

The olefin block copolymer is a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present OBC is characterized by unique distributions of both polymer polydispersity (PDI or Mw/Mn or MWD), block length distribution, and/or block number distribution, due, in an embodiment, to the effect of the shuttling agent(s) in combination with multiple catalysts used in their preparation.

In an embodiment, the OBC is produced in a continuous process and possesses a polydispersity index, PDI, from 1.7 to 3.5, or from 1.8 to 3, or from 1.8 to 2.5, or from 1.8 to 2.2. When produced in a batch or semi-batch process, the OBC possesses PDI from 1.0 to 3.5, or from 1.3 to 3, or from 1.4 to 2.5, or from 1.4 to 2.

In addition, the olefin block copolymer possesses a PDI fitting a Schultz-Flory distribution rather than a Poisson distribution. The present OBC has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present olefin block copolymer possesses a most probable distribution of block lengths. In an embodiment, the olefin block copolymer is defined as having:

(A) Mw/Mn from 1.7 to 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)^2,$$

where d is from 0.850 g/cc, or 0.860 g/cc, or 0.866 g/cc, or 0.87 g/cc, or 0.880 g/cc to 0.89 g/cc, 0.91 g/cc, or 0.925 g/cc, and Tm is from 113° C., or 115° C., or 117° C., or 118° C. to 120° C., or 121° C., or 125° C.; and/or (B) Mw/Mn from 1.7 to 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$$\Delta T > -0.1299 \Delta H + 62.81 \text{ for } \Delta H \text{ greater than zero and up to 130 J/g}$$

$$\Delta T > 48° \text{ C. for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d); \text{ and/or}$$

(D) has a molecular fraction which elutes between 40° C. and 130° C. when fractionated using TREF, characterized in that the fraction has a molar comonomer content greater than, or equal to, the quantity (−0.2013) T+20.07, more preferably greater than or equal to the quantity (−0.2013) T+21.07, where T is the numerical value of the peak elution temperature of the TREF fraction, measured in ° C.; and/or, (E) has a storage modulus at 25° C., G'(25° C.), and a storage modulus at 100° C., G'(100° C.), wherein the ratio of G'(25° C.) to G'(100° C.) is in the range of 1:1 to 9:1.

The olefin block copolymer may also have:

(F) a molecular fraction which elutes between 40° C. and 130° C. when fractionated using TREF, characterized in that the fraction has a block index of at least 0.5 and up to 1 and a molecular weight distribution, Mw/Mn, greater than 1.3; and/or (G) average block index greater than zero and up to 1.0 and a molecular weight distribution, Mw/Mn greater than 1.3. It is understood that the olefin block copolymer may have one, some, all, or any combination of properties (A)-(G). Block Index can be determined as described in detail in U.S. Pat. No. 7,608,668 herein incorporated by reference for that purpose. Analytical methods for determining properties (A) through (G) are disclosed in, for example, U.S. Pat. No. 7,608,668, Col. 31, line 26 through Col. 35, line 44, which is herein incorporated by reference for that purpose.

Suitable monomers for use in preparing the present OBC include ethylene and one or more addition polymerizable monomers other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, preferably 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

The olefin block copolymer has a density of from 0.850 g/cc to 0.925 g/cc, or from 0.860 g/cc to 0.88 g/cc or from 0.860 g/cc to 0.879 g/cc. The OBC has a Shore A value of 40 to 70, preferably from 45 to 65 and more preferably from 50 to 65. In an embodiment, the olefin block copolymer has a melt index (MI) from 0.1 g/10 min to 30 g/10, or from 0.1 g/10 min to 20 g/10 min, or from 0.1 g/10 min to 15 g/10 min, as measured by ASTM D 1238 (190° C./2.16 kg). The composition may comprise more than one olefin block copolymer.

The olefin block copolymers can be produced via a chain shuttling process such as described in U.S. Pat. No. 7,858,706, which is herein incorporated by reference. In particular, suitable chain shuttling agents and related information are listed in Col. 16, line 39 through Col. 19, line 44. Suitable catalysts are described in Col. 19, line 45 through Col. 46, line 19 and suitable co-catalysts in Col. 46, line 20 through Col. 51 line 28. The process is described throughout the document, but particularly in Col. Col 51, line 29 through Col. 54, line 56. The process is also described, for example, in the following: U.S. Pat. No. 7,608,668; U.S. Pat. No. 7,893,166; and U.S. Pat. No. 7,947,793.

In an embodiment, the olefin block copolymer is an ethylene/octene multi-block copolymer with a density from 0.86 g/cc to 0.88 g/cc, a Tm from 118° C. to 120° C., a melt index from 0.5 g/10 min to 5.0 g/10 min and a Mw/Mn from 1.7 to 3.5.

2. Silane-Grafted Olefin Block Copolymer

The present PSA composition includes a silane-grafted olefin block copolymer. A "silane-grafted olefin block copolymer," as used herein, is an olefin block copolymer as described above that is grafted with at least one silane compound.

In an embodiment, the silane-grafted olefin block copolymer has a molecular weight distribution from about 1 to 7, or from 1.5 to 6, or from 2 to 5. All individual values and subranges from about 1 to 7 are included herein and disclosed herein.

In an embodiment, the silane-grafted olefin block copolymer has a density from 0.855 g/cc to 0.955 g/cc, or from 0.86 g/cc to 0.90 g/cc, or from 0.865 g/cc to 0.895 g/cc. All individual values and subranges from 0.84 g/cc to 0.955 g/cc are included herein and disclosed herein.

In an embodiment, the amount of silane used in the grafting reaction is greater than, or equal to, 0.05 parts per hundred ("phr" based on the amount of the olefin interpolymer), or from 0.5 phr to 6 phr, or from 0.5 phr to 4 phr. All individual values and subranges from 0.05 phr to 6 phr are included herein and disclosed herein.

In an embodiment, the amount of amount of initiator used in the grafting reaction is less than, or equal to, 4 millimoles radicals per 100 grams olefin interpolymer, or less than, or equal to, 2 millimoles radicals per 100 grams olefin interpolymer, or less than, or equal to, 1 millimoles radicals per 100 grams olefin interpolymer. All individual values and subranges from 0.01 millimoles to 4 millimoles radicals per 100 grams olefin interpolymer are included herein and disclosed herein.

In an embodiment, the amount of silane constituent grafted on the polyolefin chain is greater than, or equal to, 0.05 weight percent (based on the weight of the olefin block copolymer), as determined by FTIR analysis, or other appropriate method. In a further embodiment, this amount is greater than, or equal to, 0.5 weight percent, and in yet a further embodiment, this amount is greater than, or equal to, 1.2 weight percent. In an embodiment, the amount silane constituent grafted on the olefin interpolymer is from 0.5 weight percent to 5.0 weight percent. All individual values and subranges greater than 0.05 weight percent to 5.0 weight percent are considered within the scope of this invention, and are disclosed herein.

Suitable silanes include, but are not limited to, those of the general formula (I):

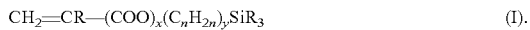

$$CH_2=CR-(COO)_x(C_nH_{2n})_ySiR'_3 \qquad (I).$$

In this formula, R is a hydrogen atom or methyl group; x and y are 0 or 1, with the proviso that when x is 1, y is 1; n is an integer from 1 to 12 inclusive, or 1 to 4, and each R' independently is an organic group, including, but not limited to, an alkoxy group having from 1 to 12 carbon atoms (e.g. methoxy, ethoxy, butoxy), an aryloxy group (e.g. phenoxy), an araloxy group (e.g. benzyloxy), an aliphatic or aromatic siloxy group, an aromatic acyloxyl group, an aliphatic acyloxy group having from 1 to 12 carbon atoms (e.g. formyloxy, acetyloxy, propanoyloxy), amino or substituted amino groups (alkylamino, arylamino), or a lower alkyl group having 1 to 6 carbon atoms.

In an embodiment, the silane compound is selected from vinyltrialkoxysilanes, vinyltriacyloxysilanes or vinyltrichlorosilane. In addition, any silane, or mixtures of silanes, which will effectively graft to, and/or crosslink, the olefin block copolymer can be used in the practice of this invention. Suitable silanes include unsaturated silanes that comprise both an ethylenically unsaturated hydrocarbyl group, such as a vinyl, allyl, isopropenyl, butenyl, cyclohexenyl or γ-(meth)acryloxy allyl group, and a hydrolyzable group, such as, a hydrocarbyloxy, hydrocarbonyloxy, or hydrocarbylamino group, or a halide. Examples of hydrolyzable groups include methoxy, ethoxy, formyloxy, acetoxy, proprionyloxy, chloro, and alkyl or arylamino groups. Preferred silanes are the unsaturated alkoxy silanes which can be grafted onto the polymer. These silanes and their method of preparation are more fully described in U.S. Pat. No. 5,266,627 to Meverden, et al., which is incorporated herein, in its entirety, by reference.

In an embodiment, silanes include vinyltrimethoxysilane (VTMS), vinyltriethoxysilane, 3-(trimethoxysilyl)propyl methacrylate (γ-(meth)acryloxypropyl trimethoxysilane), and mixtures thereof.

The silane can be grafted to the polymer by any conventional method, typically in the presence of a free radical initiator, for example peroxides and azo compounds, etc., or by ionizing radiation. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(tert-butyl peroxy)hexane, lauryl peroxide, and tert-butyl peracetate. A suitable azo compound is 2,2'-azobis(isobutyronitrile).

The amount of initiator and silane employed will affect the final structure of the silane grafted polymer, such as, for example, the degree of grafting in the grafted polymer and the degree of crosslinking in the cured polymer. The resulting structure, will in turn, affect the physical and mechanical properties of the final product. Typically, the amount of initiator and silane employed will not exceed that which is determined to provide the desired level of crosslinking, and the resulting properties in the polymer.

The grafting reaction should be performed under conditions that maximize grafts onto the polymer backbone, and minimize side reactions, such as the homopolymerization of grafting agent, which is not grafted to the polymer. Some silane agents undergo minimal or no homopolymerization, due to steric features in the molecular structure, low reactivity and/or other reasons.

Cure (crosslinking) of a silanated graft is promoted with a crosslinking catalyst, and any catalyst that will effectively promote the crosslinking of the particular grafted silane can be used. These catalysts generally include acids and bases, and organometallic compounds, including organic titanates, organic zirconates, and complexes or carboxylates of lead, cobalt, iron, nickel, zinc and tin.

Dibutyltin dilaurate, dioctyltin maleate, dibutyltin diacetate, dibutyltin dioctoate, stannous acetate, stannous octoate, lead naphthenate, zinc caprylate, cobalt naphthenate, and the like, can be used. The amount of catalyst will depend on the particular system at issue.

In certain embodiments, dual crosslinking systems, which use a combination of radiation, heat, moisture and crosslinking steps, may be effectively employed. For instance, it may be desirable to employ peroxide crosslinking agents in conjunction with silane crosslinking agents, peroxide crosslinking agents in conjunction with radiation, or sulfur-containing crosslinking agents in conjunction with silane crosslinking agents. Dual crosslinking systems are disclosed, and claimed in, U.S. Pat. Nos. 5,911,940 and 6,124,370, the entire contents of both are herein incorporated by reference.

In an embodiment, the silane-grafted olefin block copolymer has a Peel Adhesion Failure Temperature (PAFT) of greater than, or equal to, 110° F. (43° C.), or a Shear Adhesion Failure Temperature (SAFT) of greater than, or equal to, 140° F. (60° C.); or both wherein PAFT and SAFT are measured as follows:

Shear Adhesion Failure Temperature (SAFT)

Shear adhesion failure temperature (SAFT) of each sample is measured according to ASTM D 4498 with a 500 gram weight in the shear mode. The tests are started at room temperature (25° C./77° F.) and the oven temperature was ramped at an average rate of 0.5° C./minute. The temperature at which the specimen failed was recorded. This measurement is used as an indication of the heat resistance of the composition which is important for shipping.

Peel Adhesion Failure Temperature (PAFT)

Peel adhesion failure temperature (PAFT) is tested according to ASTM D 4498 with a 100 gram weight in the peel mode. The tests are started at room temperature (25° C./77° F.) and the temperature is increased at an average rate of 0.5° C. minute.

In an embodiment, the silane-grafted olefin block copolymer has a molecular weight distribution (Mw/Mn) from about 1 to about 3.5 and/or a number average molecular weight from 5,000 to 25,000.

In an embodiment, the silane-grafted olefin block copolymer includes a vinyltrialkoxysilane with 0.1 wt %, or 0.5 wt %, or 1.0 wt %, or 1.5 wt %, or 2.0 wt %, or 2.5 wt % to 3.0 wt %, or 3.5 wt %, or 4.0 wt %, or 4.5 wt. %, or 5.0 wt % grafted vinyltrialkoxysilane.

Weight percent is based on total weight of the vinyltrialkoxysilane-grafted olefin block copolymer.

In an embodiment, the silane-grafted olefin block copolymer is a VTMS-grafted olefin block copolymer with 0.1 wt %, or 0.5 wt %, or 1.0 wt %, or 1.5 wt %, or 2.0 wt %, or 2.5 wt % to 3.0 wt %, or 3.5 wt %, or 4.0 wt %, or 4.5 wt %, or 5.0 wt % grafted VTMS. Weight percent is based on total weight of the VTMS-grafted olefin block copolymer.

3. Tackifier

The present PSA composition includes a tackifier. The tackifier may modify the properties of the composition such as viscoelastic properties (e.g., tan delta), rheological properties (e.g., viscosity), tackiness (e.g., ability to stick), pressure sensitivity, and wetting property. In some embodiments, the tackifier is used to improve the tackiness of the composition. In other embodiments, the tackifier is used to reduce the viscosity of the composition. In further embodiments, the tackifier is used to render the composition a pressure-sensitive adhesive. In particular embodiments, the tackifier is used to wet out adherent surfaces and/or improve the adhesion to the adherent surfaces.

The tackifier may be a non-hydrogenated aliphatic $C_5$ (five carbon atoms) resin, a hydrogenated aliphatic $C_5$ resin, an aromatic grafted $C_5$ resin, a terpene resin, a hydrogenated $C_9$ resin, or combinations thereof.

In an embodiment, the tackifier is a hydrogenated $C_9$ resin. The tackifier has a Ring and Ball softening temperature (measured in accordance with ASTM E 28) from 60° C., or 80° C., or 85° C. to 90° C. to 100° C., or 110° C., or 120° C., or 130° C. The tackifier has a melt viscosity at 150° C. (measured in accordance with ASTM D 3236) from 500 milliPascal-seconds (mPa-s), or 600 mPa-s, or 700 mPa-s, or 800 mPa-s to 900 mPa-s, or 1000 mPa-s.

In an embodiment, the tackifier is a hydrogenated $C_9$ resin and has a softening temperature from 85° C. to 95° C. and a melt viscosity at 150° C. from 700 mPa-s to 900 mPa-s.

Nonlimiting examples of suitable tackifier include tackifiers sold under the trade name ARKON, available from Arakawa Chemical Industries, Ltd.

4. Oil

The present PSA composition includes an oil. The oil may reduce viscosity and/or improve tack properties. Non-limiting examples of suitable oils include mineral oils such as naphthenic, paraffinic, or hydrogenated (white) oils (e.g., Kaydol oil), vegetable and animal oil and their derivatives, petroleum derived oils, and combinations thereof. In an embodiment, the oil has an viscosity at 40° C. from 10 centistokes (cst) to 1000 cst.

Nonlimiting examples of suitable oil include oils sold under the trade name CATENEX available from The Shell Oil Company.

5. Antioxidant

The present pressure sensitive adhesive composition optionally includes an antioxidant. Non-limiting examples of suitable antioxidants include amine-based antioxidants such as alkyl diphenylamines, phenyl-α-naphthylamine, alkyl or aralkyl substituted phenyl-α-naphthylamine, alkylated p-phenylene diamines, tetramethyl-diaminodiphenylamine and the like; and hindered phenol compounds such as 2,6-di-t-butyl-4-methylphenol; 1,3,5-trimethyl-2,4,6-tris (3',5'-di-t-butyl-4'-hydroxybenzyl)benzene; tetrakis [(methylene(3,5-di-t-butyl-4-hydroxyhydrocinnamate)]methane (e.g., IRGANOX 1010, from Ciba Geigy, New York); octadecyl-3,5-di-t-butyl-4-hydroxycinnamate (e.g., IRGANOX 1076, commercially available from Ciba Geigy), tetrakismethylene (3,5-di-t-butyl-4-hydroxyhydrocinnamate) methane (e.g., ANOX 20 commercially available from Chemtura Corporation), and combinations thereof. Where used, the amount of the antioxidant in the composition can be from about greater than 0 to about 1 wt %, from about 0.05 to about 0.75 wt %, or from about 0.1 to about 0.5 wt % of the total weight of the composition.

In an embodiment, the PSA composition has a melt viscosity at 180° C. from 1000 mPa-s to 60,000 mPa-s.

In an embodiment, the PSA composition includes:
25 wt % to 35 wt % of the olefin block copolymer;
1 wt % to 5 wt % of the silane grafted olefin block copolymer;
55 wt % to 65 wt % of the tackifier;
5 wt % to 15 wt % of the oil; and
0.1 wt % to 0.5 wt % antioxidant.

In an embodiment, the olefin block copolymer of the PSA composition is the same as the base olefin block copolymer of the silane-grafted olefin block copolymer prior to grafting.

In an embodiment, the PSA composition has a loop tack greater than 4.0 N/25 mm. In a further embodiment, the PSA composition has a loop tack from greater than 4.0 N/25 mm to 5.0 N/25 mm, or 6.0 N/25 mm.

In an embodiment, the PSA composition has a shear adhesion greater than 60 minutes. In a further embodiment, the PSA composition has a shear adhesion from greater than 60 minutes, or 70 minutes, or 80 minutes, to 85 minutes, or 90 minutes, or 95 minutes.

In an embodiment, the PSA composition has a peel strength (steel) greater than 25.0 N/25 mm. In a further embodiment, the PSA composition has a peel strength (steel) from 26.0 N/25 mm, or 27.0 0 N/25 mm, or 28.0 0 N/25 mm to 29.0 0 N/25 mm, or 30.0 0 N/25 mm, or 31.0 N/25 mm, or 32.0 N/25 mm.

In an embodiment, the PSA composition has a peel strength (polyethylene, or PE) greater than 2.0 N/25 mm. In a further embodiment, the PSA composition has a peel strength (polyethylene) from 2.10 N/25 mm, or 2.2 0 N/25 mm to 2.6 0 N/25 mm, or 2.7 0 N/25 mm, or 3.0 N/25 mm.

In an embodiment, the PSA composition has a loop tack from greater than 4.0 N/25 mm to 5.0 N/25 mm and a shear adhesion from greater than 80.0 minutes to 90.0 minutes.

Definitions

Unless stated to the contrary, implicit from the context, or customary in the art, all parts and percents are based on weight, and all test methods are current as of the filing date of this disclosure.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

Test Methods

Melt Index

Melt index (I2) is measured in accordance with ASTM D-1238 (190° C.; 2.16 kg). The result is reported in grams/10 minutes. Melt flow rate (MFR) is measured in accordance with ASTM D-1238 (230° C.; 2.16 kg). The result is reported in grams/10 minutes.

Density

Density is measured in accordance with ASTM D792. The result is reported in grams (g) per cubic centimeter (cc), or g/cc.

Melt Viscosity

Melt viscosity is measured in accordance with ASTM D3236. The results are reported in milliPascal-second, or mPa-s. Melt viscosity is determined by ASTM D3236, which is incorporated herein by reference, using a Brookfield Laboratories DVII+Viscometer equipped with disposable aluminum sample chambers. In general, a SC-31 spindle is used, suitable for measuring viscosities in the range of from 30 to 100,000 centipoise (cP). If the viscosity is outside this range, an alternate spindle should be used which is suitable for the viscosity of the polymer. A cutting blade is employed to cut samples into pieces small enough to fit into the 1 inch wide, 5 inches long samples chamber. The disposable tube is charged with 8-9 grams of polymer. The sample is placed in the chamber, which is in turn inserted into a Brookfield Thermosel and locked into place with bent needle-nose pliers. The sample chamber has a notch on the bottom that fits in the bottom of the Brookfield Thermosel to ensure that the chamber is not allowed to turn when the spindle is inserted and spinning. The sample is heated to the desired temperature (177° C./350° F.). The viscometer apparatus is lowered and the spindle submerged into the sample chamber. Lowering is continued until brackets on the viscometer align on the Thermosel. The viscometer is turned on, and set to a shear rate which leads to a torque reading in the range of 40 to 70 percent. Readings are taken every minute for about 15 minutes, or until the values stabilize, and then the final reading is recorded. The results are reported in milliPascal-second, or mPa-s.

Gel Permeation Chromatography (GPC)

Conventional GPC measurements are used to determine the weight-average (Mw) and number-average (Mn) molecular weight of the polymer, and to determine the MWD (=Mw/Mn). "Samples are analyzed with a high-temperature GPC instrument (Polymer Laboratories, Inc. model PL220).

The method employs the well-known universal calibration method, based on the concept of hydrodynamic volume, and the calibration is performed using narrow polystyrene (PS) standards, along with four Mixed A 20 μm columns (PLgel Mixed A from Agilent (formerly Polymer Laboratory Inc.)) operating at a system temperature of 140° C. Samples are prepared at a "2 mg/mL" concentration in 1,2,4-trichlorobenzene solvent. The flow rate is 1.0 mL/min, and the injection size is 100 microliters.

As discussed, the molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in Journal of Polymer Science, Polymer Letters, Vol. 6, (621) 1968) to derive the following equation:

$$M_{polyethylene} = a*(M_{polystyrene})^b.$$

In this equation, a=0.4316 and b=1.0 (as described in Williams and Ward, *J. Polym. Sc., Polym. Let.*, 6, 621 (1968)). Polyethylene equivalent molecular weight calculations were performed using VISCOTEK TriSEC software Version 3.0.

Differential Scanning calorimetry (DSC)

Differential Scanning calorimetry (DSC) is used to measure crystallinity in the polymers (e.g., ethylene-based (PE) polymers). About 5 to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for polypropylene or "PP"). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)×100 (for PE)).

Unless otherwise stated, melting point(s) ($T_m$) of each polymer is determined from the second heat curve (peak Tm), and the crystallization temperature ($T_c$) is determined from the first cooling curve (peak Tc).

180 Degree Peel Adhesion to Stainless Steel and Polyethylene

The 180 degree peel adhesion to stainless steel and also to polyethylene (PE) test panels is tested according to the Pressure Sensitive Tape Council PSTC-1 method with a peel rate of 300 millimeter/minute (mm/min).

Loop Tack

The loop tack is determined in accordance with DIN EN 1719. The result is reported in Newtons (N) per 25 millimeter (mm), or N/25 mm.

Shear Adhesion

Shear is a measure of the holding power of an adhesive composition when it is laminated to a substrate. Shear holding time (in minutes) is measured at 60° C. according to PSTC-7 using a 1 kg weight.

Some embodiments of the present disclosure will now be described in detail in the following Examples.

EXAMPLES

1. Materials

Materials used in the inventive examples and the comparative samples are provided in Table 1 below. Polymers are typically stabilized with one or more antioxidants and/or other stabilizers.

TABLE 1

Starting Materials

| Material | Description | Graft comonomer wt % | I2 | Tm (° C.) | Density (g/cc) |
|---|---|---|---|---|---|
| INFUSE 9807 | Ethylene/octene multi-block copolymer | — | 15 | 118 | 0.866 |
| Silane grafted INFUSE 9807 | VTMS grafted ethylene/octene multi-block copolymer | 5.0% VTMS* | | | |
| ARKON P90 | Tackifier resin Softening point (ASTM E28) 90° C. Melt viscosity at 150° C. (ASTM D3236) 800 mPa-s | — | NA | NA | NA |
| CATENEX T145 | Oil | — | NA | NA | NA |
| ANOX 20 | Antioxidant | — | NA | NA | NA |

*Weight percent based on total weight of the grafted polymer.

2. Preparation of Adhesive Formulations

A 200 g batch of (i) a control PSA formulation (Control) and (ii) a 200 g batch of the present inventive PSA formulation (Inventive Composition) are prepared with materials from Table 1 and in the amounts shown in Table 2 below. Amounts in Table 2 are in weight percent based on total weight of each formulation.

TABLE 2

| Material | Control | Inventive Composition |
|---|---|---|
| INFUSE 9807 | 32 | 30 |
| Silane grafted INFUSE 9807 | — | 2 |
| Akron P90 | 57.8 | 57.8 |
| CATENEX T145 | 10 | 10 |
| ANOX 20 | 0.2 | 0.2 |

The components in Table 2 are mixed with a Sigma Blade laboratory kneader from Werner and Pfleiderer. The filling, set, and end temperatures are 130° C., 180° C. and 152° C. respectively. Starting with the polymer, the other components are added in small amounts in order to obtain a homogeneous mixture. A 20 minute filling time followed by a 60 minute mixing time is used and the homogeneous mixture is poured from the kneader onto silicone coated paper and allowed to cool. The mixing produces a control PSA composition (Control) and an inventive PSA composition (Inventive Composition).

Mixing process conditions used to prepare the Control and Inventive Composition are shown in Table 3 below.

TABLE 3

Processing Conditions - Blend

| Sample | Mass (g) | Filling temp. °C. | Set temp. °C. | End temp. °C. | Filling interval min | Mixing interval min |
|---|---|---|---|---|---|---|
| Control | 200 | 130 | 180 | 152 | 20 | 60 |
| Inventive Composition | 200 | 130 | 180 | 152 | 20 | 60 |

3. Coating of Pressure Sensitive Adhesive Samples

Each of the Control and the Inventive Composition is coated onto a separate Mylar sheet using a KBS Film Drawing Line under the processing conditions shown in Table 4 below.

TABLE 4

Processing Conditions - Coating

| Sample | Mass g | Melting temp. °C. | Table temp. °C. | Rakel temp. °C. | Gap mm | Coating weight g/m$^2$ |
|---|---|---|---|---|---|---|
| Control | 20 | 180 | 110 | 180 | 0.35 | 54 |
| Inventive Composition | 20 | 180 | 110 | 180 | 0.37 | 50 |

Properties for each adhesive coat, the coat made with the Control and the coat made with the Inventive Composition, are shown in Table 5 below.

TABLE 5

Adhesive Coat Composition and Properties

| Material | Control | Inventive Composition |
|---|---|---|
| INFUSE 9807 | 32 | 30 |
| Silane grafted INFUSE 9807 | — | 2 |
| ARKON P90 | 57.8 | 57.8 |
| CATENEX T145 | 10 | 10 |
| ANOX 20 | 0.2 | 0.2 |
| Peel strength (steel) N/25 mm | 34.2 | 29.2 |
| Peel strength (PE) N/25 mm | 3.7 | 2.6 |
| Loop tack N/25 mm | 5.2 | 4.5 |
| Shear adhesion 60° C. (min.) | 44.0 | 85.0 |

4. Discussion

Applicant discovered that the addition of a minor amount (1 wt % to 5 wt %) of silane grafted olefin block copolymer to an OBC-based PSA composition significantly improves the shear performance without detriment to the peel strength and the loop tack performance. When compared to the Control composition, the Inventive Composition in Table 5 shows a nearly 2-fold increase in shear adhesion (85.0 min. vs 44.0 min.) while simultaneously (i) maintaining loop tack substantially the same (4.5 N/25 mm vs. 5.2 N/25 mm) and (ii) maintaining the peel strength the same (29.2 25 N/mm vs 34.2 25 N/mm (steel)). The ability of the present PSA composition to maintain loop tack and peel strength which simultaneously increasing shear adhesion at least two-fold is surprising and unexpected.

It is specifically intended that the present disclosure not be limited to the embodiments and illustrations contained herein, but include grafted forms of those embodiments including portions of the embodiments and combinations of elements of different embodiments as come within the scope of the following claims.

The invention claimed is:

1. A pressure sensitive adhesive composition comprising:
   an ethylene/α-olefin multi-block copolymer comprising hard segments and soft segments, the hard segments and soft segments comprising ethylene, the ethylene/α-olefin multi-block copolymer having a melt index from 0.1 g/10 min to 30.0 g/10 min;
   a silane-grafted ethylene/α-olefin multi-block copolymer comprising hard segments and soft segments, the hard segments and soft segments comprising ethylene, the base ethylene/α-olefin multi-block copolymer having a melt index from 0.1 g/10 min to 30.0 g/10 min;
   a tackifier;
   an oil;
   wherein the composition has a shear adhesion greater than 60 minutes.

2. The pressure sensitive adhesive composition of claim 1 comprising
   25 wt % to 35 wt % of the ethylene/α-olefin multi-block copolymer;
   1 wt % to 5 wt % of the silane grafted ethylene/α-olefin multi-block copolymer;
   55 wt % to 65 wt % of the tackifier;
   5 wt % to 15 wt % of the oil; and
   0.1 wt % to 0.5 wt % antioxidant.

3. The pressure sensitive adhesive composition of claim 1 wherein the ethylene/α-olefin multi-block copolymer and the base polymer of the silane grafted ethylene/α-olefin multi-block copolymer are the same.

4. The pressure sensitive adhesive composition of claim 3 wherein the ethylene/α-olefin multi-block copolymer is an ethylene/octene multi-block copolymer.

5. The pressure sensitive adhesive composition of claim 1 wherein the tackifier is a $C_9$ hydrogenated tackifier.

6. The pressure sensitive adhesive composition of claim 1 wherein the composition has a loop tack greater than 4.0 N/25 mm.

7. The pressure sensitive adhesive composition of claim 1 wherein the composition has a shear adhesion from 70 minutes to 90 minutes.

8. The pressure sensitive adhesive composition of claim 1 wherein the composition has a peel strength (adhesion to stainless steel) greater than 25 N/25 mm.

9. The pressure sensitive adhesive composition of claim 1 wherein the composition has a peel strength (adhesion to polyethylene) greater than 2.0 N/25 mm.

10. The pressure sensitive adhesive composition of claim 1 wherein the composition has a loop tack greater than 4.0 N/25 mm and a shear adhesion greater than 80 minutes.

11. The pressure sensitive adhesive composition of claim 1 wherein the ethylene/α-olefin multi-block copolymer and the base ethylene/α-olefin multi-block copolymer each has a melt index from 0.5 g/10 min to 5.0 g/10 min.

12. The pressure sensitive adhesive composition of claim 1 wherein the base polymer of the silane grafted ethylene/α-olefin multi-block copolymer is an ethylene/octene multi-block copolymer.

* * * * *